July 6, 1937.  H. JENKS  2,086,270
SCREW DRIVER
Filed Sept. 11, 1936

Inventor
By Hart Jenks.
Hiram A. Sturges  Attorney

Patented July 6, 1937

2,086,270

UNITED STATES PATENT OFFICE 2,086,270

SCREW DRIVER

Hart Jenks, Lincoln, Nebr.

Application September 11, 1936, Serial No. 100,230

2 Claims. (Cl. 145—50)

This invention relates to an improvement in screw drivers and more particularly to an attachment for the distal end thereof.

It is an object of the invention to provide an attachment of such construction that pressure of the tool while rotating the screw will cause the blade or distal end of the shank to become locked or firmly secured to the head of the screw to prevent accidental detachment of the blade from the slot of the screw, and to provide such a construction that an increased pressure of the screw driver will cause an increased grip for preventing said detachment.

Another object is to provide an attachment for the shank of a screw driver which may be applied to the head of a screw and will hold the screw in alignment with the shank ready for use, said appliance being of such form that it may be conveniently and readily inserted in the slot of the screw.

The invention includes an appliance which normally projects beyond the distal end of the shank of the screw driver, said appliance being resilient and of such attenuated form that it will bend laterally into contact with one wall of the slot of the screw-head when pressure is applied to the screw driver, the engagement of the appliance with said wall causing the shank to be pressed against the opposite wall of the slot, whereby the screw will be secured for all practical purposes to the end of the shank of the screw driver.

The invention also includes certain adjustable features, whereby the distance to which the appliance will normally project beyond the end of the shank may be changed for use upon large or small screws.

With the foregoing objects in view the invention presents a new and useful construction, combination and arrangement of parts as described herein and claimed, and as illustrated in the accompanying drawing, it being understood that I may make changes in size, proportions and minor details as found to be of advantage, said changes being within the scope of the invention as claimed.

In the accompanying drawing Fig. 1 is a view in front elevation showing the lower end-portion of the shank of a screw driver with the attachment applied thereon.

Figure 1:
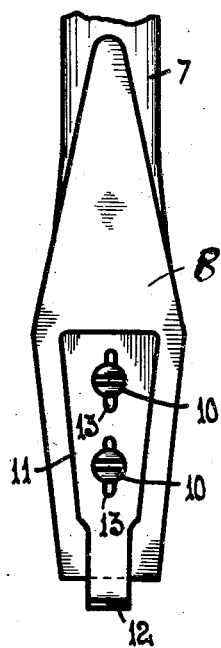

Referring now to the drawing for a more particular description, the invention is shown and described in connection with the shank 7 of a screw driver, the handle or brace for holding the shank not being shown, and the parts shown in the drawing being on an enlarged scale to clearly illustrate construction.

Figure 3:
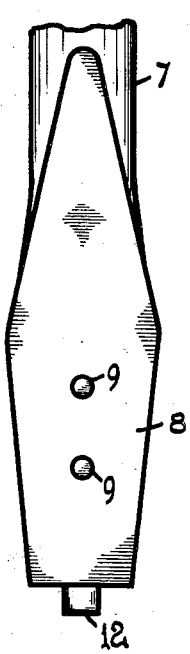
Fig. 3 is a rear view of parts shown in Fig. 1.
Figure 4:
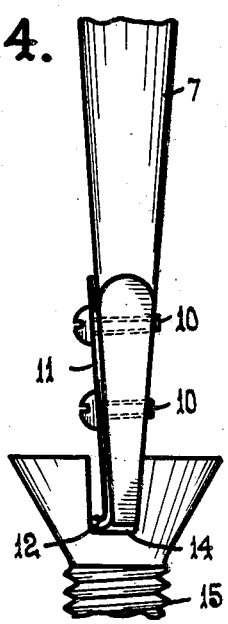
Fig. 4 is a view similar to that shown in Fig. 2, the shank of the screw driver and the appliance being completely seated in the slot of the screw.
Figure 5:
Fig. 5 is an edgewise view of the appliance shown in Figs. 1, 2, 3 and 4.

The particular kind of shank for the screw driver is not important since the appliance to be described may be applied to one of the flat convergent surfaces or facets 8 of the distal end thereof, small openings 9 (Fig. 3) being provided for receiving the screws 10 which are threaded therein.

Figure 6:
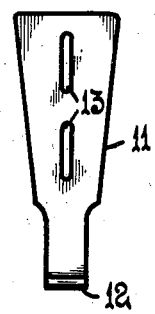
Fig. 6 is a front view of the appliance.

The attachment to be mounted on the shank and to normally project beyond the end of said shank consists of a spring having a flat rectilinear body portion 11 and its laterally curved terminal part 12, said spring-arm being of convergent form from its top toward its curved terminal as shown in Fig. 6.

Numerals 13 indicate a pair of slots which are formed in the body of the spring-arm, and therefore the appliance may be adjusted to permit the curved part 12 to project a selected distance below the distal end or blade of the shank.

As thus described, the spring may be disposed with its flat body in contact with the flat surface 8 of the shank 7 the slots 13 receiving the keepers or screws 10 which are threaded in the shank, and since the heads of the screws may be pressed against the spring, the latter may be rigidly secured to the shank.

I am aware that springs have heretofore been mounted on the shanks of screw drivers as an aid in securing the screws to the blade but I am not aware that springs with curved terminals normally projecting beyond the ends of the blades have ever been used or known to others.

Figure 2:
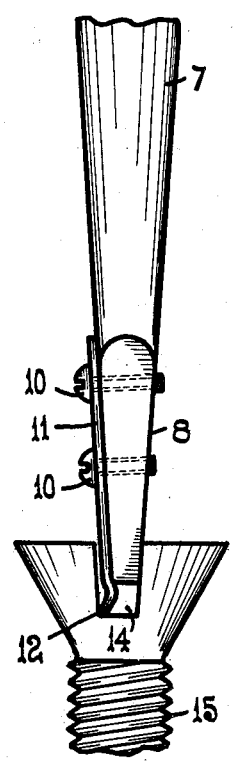
Fig. 2 is a view of parts taken at right-angles to the view shown in Fig. 1, a screw being added.

In operation, since the end of the spring has an outward curvature relative to the blade and is normally disposed below the end of the blade the screw may be readily and conveniently attached to the shank as shown in Fig. 2 of the drawing, the screw being maintained in alignment with the shank ready for use. One reason why the screw will be secured to the blade of the shank is that the curved terminal of the spring will be pressed against one wall of the slot 14 of screw 15, said blade, by action of the spring, being pressed against that wall of the slot opposite to the spring.

One reason why the blade of the shank may be readily inserted in the slot 14 of the screw is the fact that the terminal part of the spring has an outward curvature relative to the end of the shank and may bend yieldingly to looped position while entering the slot 14, and this feature is considered to be important.

In the drawing Fig. 1 illustrates the position of parts after a downward pressure has been applied to the tool. When this downward pressure has been applied the blade will engage the bottom of the slot and will be pressed against one of the walls of the slot by action of the curved part 12 of the spring, so that the blade will not become disengaged from the slot while the screw is rotated by the rotatable movement of the tool.

It will be noted that the lower end of the spring-arm and its curved terminal 12 are of lesser width than the blade of the shank 7, and therefore when the tool is rotated for causing a rotatable movement of the screw, this spring-arm will operate as a fulcrum for the reason that the center of rotation of the shank is its axis, and during rotation of the shank the middle part of the blade will not be appreciably pressed against the walls of the slot 14, but stresses will be directed to the walls of the slot by the edges of the blade for rotating the screw, the pressure of the spring operating to prevent disengagement of the blade from the screw.

Since the spring normally extends beyond the end of the blade, this feature is of great advantage when securing a screw to the blade ready for use. For this operation, all that is necessary is to place the curved end of the spring into the slot of the screw-head, and to thereafter cause a relative swinging movement of the tool and screw, the blade readily entering the slot 14 of the screw, the parts being then in the screw ready for use.

It will be appreciated that manufacture of the attachment may be carried on at limited expense, and it will be noted that all kinds of screw drivers may be used for mounting the appliance thereon, no changes being necessary except to provide the two threaded openings in the shank.

Since the spring normally projects beyond the end of the blade, and since the terminal of the spring has the curvature mentioned, said spring operates effectively when the shank is pressed into the slot 14 to maintain the blade in fixed position in said slot until the screw has been fully rotated, the pressure of the spring against the wall of the slot 14, on account of its upward curvature, being effective for this purpose.

I claim as my invention,—

1. A screw driver including a blade with opposed, convergent, rectilinear sides terminating at its end and provided with holding-means for a slotted screw, said means comprising a spring-arm having a rectilinear body-portion provided with an outwardly and upwardly curved terminal part, said arm being disposed throughout the length of its body-portion in engagement with a rectilinear side with its curved terminal part normally below the end of the blade adapted to be moved upwardly and into engagement with a wall of the slot upon movement of the blade into the slot of the screw.

2. A screw driver having its blade provided with screw-holding means, comprising a spring-arm provided with a pair of slots and having a terminal curved part, keepers threaded in the blade of the driver and engaging in the slots of said arm for disposing the curved terminal part of the arm at selected distances below the end of said blade.

HART JENKS.